(12) United States Patent
Suzuki et al.

(10) Patent No.: US 10,061,136 B2
(45) Date of Patent: Aug. 28, 2018

(54) DISPLAY DEVICE AND METHOD FOR CONTROLLING THE SAME

(71) Applicant: Japan Display Inc., Tokyo (JP)

(72) Inventors: Daichi Suzuki, Tokyo (JP); Yingbao Yang, Tokyo (JP); Takeo Koito, Tokyo (JP)

(73) Assignee: Japan Display Inc., Tokyo (JP)

( * ) Notice: Subject to any disclaimer, the term of this patent is extended or adjusted under 35 U.S.C. 154(b) by 26 days.

(21) Appl. No.: 15/070,837

(22) Filed: Mar. 15, 2016

(65) Prior Publication Data
US 2016/0274373 A1    Sep. 22, 2016

(30) Foreign Application Priority Data
Mar. 19, 2015   (JP) .................................. 2015-056233

(51) Int. Cl.
*G02B 27/22* (2018.01)
*G09G 3/00* (2006.01)
*G09G 3/36* (2006.01)

(52) U.S. Cl.
CPC ......... *G02B 27/2214* (2013.01); *G09G 3/003* (2013.01); *G09G 3/3648* (2013.01); *G09G 2300/023* (2013.01); *G09G 2310/0286* (2013.01); *G09G 2310/0291* (2013.01); *G09G 2320/028* (2013.01); *G09G 2354/00* (2013.01)

(58) Field of Classification Search
CPC ....................... G02B 27/2214; G09G 2320/028
See application file for complete search history.

(56) References Cited

U.S. PATENT DOCUMENTS

| 2011/0051239 A1 | 3/2011 | Daiku |
| 2011/0157697 A1* | 6/2011 | Bennett ..................... G06F 3/14 |
| | | 359/462 |
| 2013/0241922 A1* | 9/2013 | Kim .................. H04N 13/0409 |
| | | 345/419 |
| 2014/0036174 A1 | 2/2014 | Oka et al. |
| 2016/0195731 A1* | 7/2016 | Murao ............... H04N 13/0409 |
| | | 349/15 |
| 2016/0198149 A1 | 7/2016 | Yuuki et al. |

FOREIGN PATENT DOCUMENTS

| JP | 2011-053277 A | 3/2011 |
| JP | 2012-185231 A | 9/2012 |
| JP | 2014-032246 A | 2/2014 |
| WO | 2015/029433 A1 | 3/2015 |

OTHER PUBLICATIONS

Japanese Office Action dated May 29, 2018 for corresponding Japanese Patent Application No. 2015-056233.

* cited by examiner

*Primary Examiner* — Dennis Joseph
(74) *Attorney, Agent, or Firm* — Michael Best & Friedrich LLP

(57) ABSTRACT

A display device includes a display unit including a display plane that displays an image and a parallax adjusting unit that is arranged to face the display unit and be able to switch a plurality of transmissive regions transmitting light and a plurality of non-transmissive regions restricting light, in which the transmissive regions and the non-transmissive regions are alternately in a first direction, and width of at least one transmissive region in the first direction among the plurality of transmissive regions or width of at least one non-transmissive region in the first direction among the plurality of non-transmissive regions is changed based on input information.

17 Claims, 14 Drawing Sheets

DISPLAY DEVICE AND METHOD FOR CONTROLLING THE SAME

CROSS-REFERENCE TO RELATED APPLICATIONS

This application claims priority from Japanese Application No. 2015-056233, filed on Mar. 19, 2015, the contents of which are incorporated by reference herein in its entirety.

BACKGROUND

1. Technical Field

The present disclosure relates to a display device that displays an image and a method for controlling the same.

2. Description of the Related Art

Among display devices including a liquid crystal display (LCD) device, there is a device that enables an observer to view a stereoscopic image with the naked eyes. Japanese Patent Application Laid-open Publication No. 2011-53277 (JP-A-2011-53277) discloses a display device of a parallax barrier type including a display unit that performs a display such that a right-eye image and a left-eye image are divided and alternately arranged and a barrier unit that forms a parallax barrier on a front surface side of the display unit. The display device disclosed in JP-A-2011-53277 controls a slit width of the barrier unit according to a distance between the observer and the display unit, and increases a distance range in a front-back direction in which a stereoscopic view of a display image is possible for a display image.

The display device disclosed in JP-A-2011-53277 controls the parallax barrier by equally changing widths of a plurality of slit portions. As a result, it is possible to increase the range in the front-back direction in which a stereoscopic view is possible, but since a change in an aperture ratio of the barrier unit is increased, it may be unlikely to control an image to be displayed or adjust luminance.

SUMMARY

A display device according to an aspect of the present invention includes a display unit including a display plane that displays an image, and a parallax adjusting unit that is arranged to face the display unit and be able to switch a plurality of transmissive regions transmitting light and a plurality of non-transmissive regions restricting light, wherein the transmissive regions and the non-transmissive regions are alternately arranged in a first direction, and width of at least one transmissive region in the first direction among the plurality of transmissive regions or width of at least one non-transmissive region in the first direction among the plurality of non-transmissive regions is changed based on input information.

BRIEF DESCRIPTION OF THE DRAWINGS

FIG. 4 is a schematic view illustrating an example of display of a right-eye image and a left-eye image displayed on a display unit;

FIGS. 12A to 12C are views illustrating an example of a method for controlling a barrier unit when an observer gets closer to a display plane in a front-back direction;

DETAILED DESCRIPTION

Figure 1:
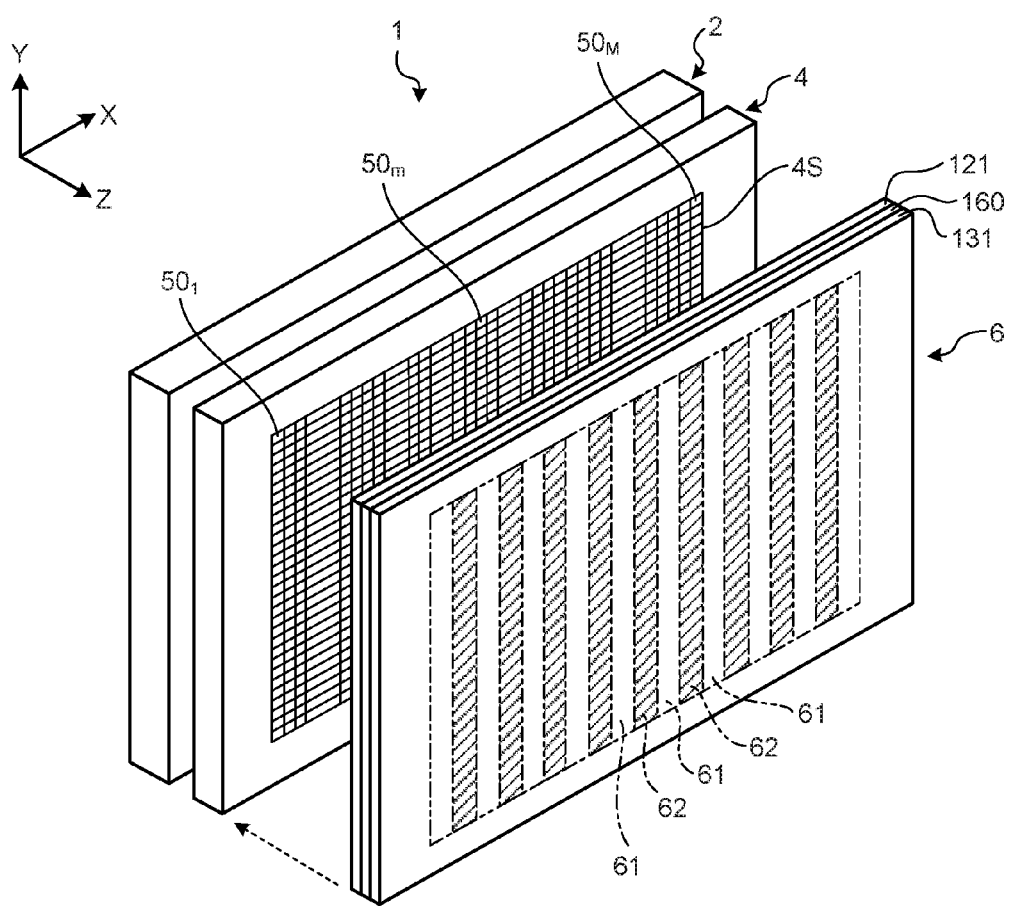
FIG. 1 is an exploded perspective view of a display device according to an embodiment.

Hereinafter, modes (embodiments) for carrying out the present invention will be described in detail with reference to the appended drawings. The present invention is not limited by description of the following embodiments. Components described below include components that can easily be assumed by those having skill in the art or components that are substantially the same. Components described below may appropriately be combined. The disclosure is merely an example, and obviously, appropriate changes that can easily be derived by those having skill in the art within the gist of the invention are included in the scope of the present invention. In order to further clarify the drawings, there are cases in which, for example, the width, the thickness, or the shape of each unit are illustrated schematically compared to an actual form, but it is merely an example and not intended to limit an interpretation of the present invention. In the present specification and the respective drawings, the same elements as those in the already-described drawings are denoted by the same reference numerals, and a detailed description thereof will appropriately be omitted.

Figure 2:
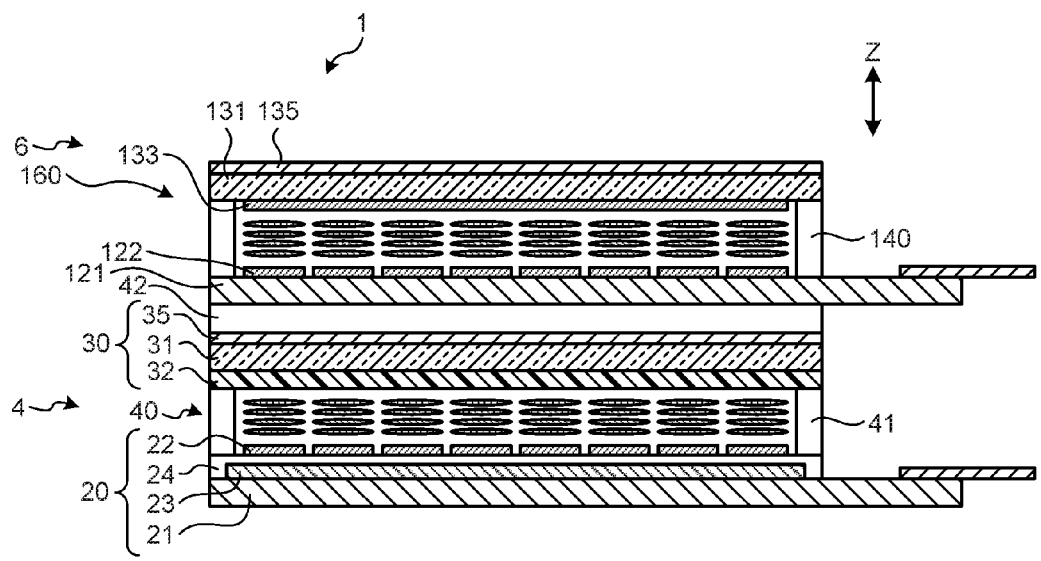
FIG. 2 is a cross-sectional view illustrating a schematic cross-sectional structure of a display device according to an embodiment.

FIG. 1 is an exploded perspective view of a display device according to an embodiment. FIG. 2 is a cross-sectional view illustrating a schematic cross-sectional structure of the display device according to the embodiment. A display device 1 of the present embodiment includes a display unit 4 including a display plane 4S on which an image is displayed, an illumination unit 2 arranged below the display unit 4, and a barrier unit 6 arranged on the display plane 4S side of the display unit 4. The barrier unit 6 is a parallax adjusting unit that adjusts parallax. In the following description, an XYZ orthogonal coordinate system is set, and a positional relation of respective units will be described with reference to the XYZ orthogonal coordinate system. An X axis direction serving as a direction within a horizontal plane is referred to as a horizontal direction. A Y axis direction serving as a direction intersecting with the X axis direction within the horizontal plane is referred to as a vertical direction. A Z axis direction intersecting with the X axis direction and the Y axis direction is referred to as a front-back direction.

The display unit 4 is a liquid crystal panel in which a plurality of pixels 50 are arranged in the X direction and the Y direction in a two-dimensional array as illustrated in FIG. 1. For example, M pixels 50 are arranged in the X direction illustrated in FIG. 1. A pixel 50 of an m-th column (here, m=1, 2, . . . , M) is indicated by a pixel $50_m$. A plurality of pixels 50 are arranged in the Y direction. Light emitted from the illumination unit 2 is incident on the display unit 4. The display unit 4 causes an image to be displayed on the display plane 4S by performing switching between transmission and shielding of light incident on the pixels 50.

The illumination unit 2 is an illumination device that emits surface light toward the display unit 4. The illumination unit 2 is installed, for example, as a backlight of the display unit 4. The illumination unit 2 includes, for example, a light source and a light guide plate. The illumination unit 2 scatters the light emitted from the light source through the light guide plate, so that the light is emitted from an emission surface facing the display unit 4. A well-known illumination unit may be used as the illumination unit 2. The illumination unit 2 is not particularly limited. The display unit 4 may be a reflective display unit such as a reflective display unit that displays an image by reflecting ambient light without the illumination unit 2, a transflective display unit that displays an image by performing switching between transmitted light from the illumination unit 2 and reflected light of the ambient light, or a front light type display unit that includes an illumination unit 2 installed on a display plane 4S side and displays an image by reflecting light from the illumination unit 2.

The barrier unit 6 includes a plurality of transmissive regions 61 that transmit light and a plurality of non-transmissive regions 62 that shield light. The transmissive regions 61 and the non-transmissive regions 62 are arranged alternately in the X direction illustrated in FIG. 1 and extend in the Y direction. For example, the barrier unit 6 is a liquid crystal panel including a liquid crystal layer 160 arranged between a first substrate 121 and a second substrate 131, and partially applies a voltage and orientates a liquid crystal. Through this operation, the barrier unit 6 switches the transmissive region 61 and the non-transmissive region 62. The barrier unit 6 may be a liquid crystal lens that includes a variable lens array and switches the transmissive region and the non-transmissive region by changing a refractive index of light. The barrier unit 6 and the display unit 4 are arranged to face each other. The barrier unit 6 is arranged on the opposite side to the illumination unit 2 with the display unit 4 interposed therebetween but not limited thereto. The barrier unit 6 may be arranged between the display unit 4 and the illumination unit 2.

The display unit 4 includes a pixel substrate 20, a counter substrate 30 arranged to face in a vertical direction to the surface of the pixel substrate 20, and a liquid crystal layer 40 arranged between the pixel substrate 20 and the counter substrate 30 as illustrated in FIG. 2.

The pixel substrate 20 includes a thin film transistor (TFT) substrate 21 serving as a circuit substrate, a plurality of common electrodes 23 formed on the surface of the TFT substrate 21, and a plurality of pixel electrodes 22 formed above the plurality of common electrodes 23 with an insulation layer 24 interposed therebetween. The plurality of pixel electrodes 22 are arranged above the TFT substrate 21 in a matrix form. The pixel electrodes 22 and the common electrodes 23 may be arranged on the same plane, or the common electrodes 23 may be arranged above the pixel electrodes 22.

TFT elements arranged in the pixels 50 and wirings such as pixel signal lines for supplying a pixel signal to the pixel electrodes 22 and scan signal lines for driving the TFT elements (which are omitted in FIG. 2) are formed on the TFT substrate 21. For example, each of the TFT elements is configured with an n-channel metal oxide semiconductor (MOS) type TFT element.

The pixels 50 are arranged in the X direction and the Y direction as illustrated in FIG. 1 and coupled with at least the other pixels 50 belonging to the same row in the pixel substrate 20 through the common electrode 23. In other words, a plurality of pixels 50 belonging to the same row share one common electrode 23. The common electrode 23 is coupled with a common electrode driver, and a common potential is supplied to a plurality of pixels 50 through the common electrode 23.

The liquid crystal layer 40 modulates light that transmits the liquid crystal layer 40 according to a state of an electric field. The display unit 4 of the present embodiment is, for example, a liquid crystal display panel of a horizontal field mode such as in-plane switching (IPS), and a liquid crystal used in the liquid crystal layer 40 is a liquid crystal suitable for use in the corresponding liquid crystal display panel as well. The display unit 4 is not limited to the liquid crystal display panel of the horizontal field mode and may be a liquid crystal display panel of a vertical field mode. The liquid crystal configuring the liquid crystal layer 40 may appropriately be changed according to the liquid crystal display panel configuring the display unit 4. For example, the liquid crystal used in the liquid crystal layer 40 may be liquid crystals of various modes such as a twisted nematic (TN), a vertical alignment (VA), and an electrically controlled birefringence (ECB). An orientation film (not illustrated) is arranged between the liquid crystal layer 40 and the pixel substrate 20, and an orientation film (not illustrated) is arranged between the liquid crystal layer 40 and the counter substrate 30.

The counter substrate 30 includes a glass substrate 31 and a color filter 32 formed on one surface of the glass substrate 31 as illustrated in FIG. 2. The TFT substrate 21 adheres to the color filter 32 through a seal portion 41. The color filter 32 faces the liquid crystal layer 40 in a direction perpendicular to the surface of the TFT substrate 21. A polarization plate 35 is arranged on the other surface of the glass substrate 31. The barrier unit 6 adheres to the surface of the polarization plate 35 at the opposite side to the glass substrate 31 side with an adhesive layer 42 interposed therebetween. The barrier unit 6 may be arranged on the counter substrate 30 directly without the adhesive layer 42 interposed therebetween. The color filter 32 may be formed on the pixel substrate 20 side.

Figure 3:
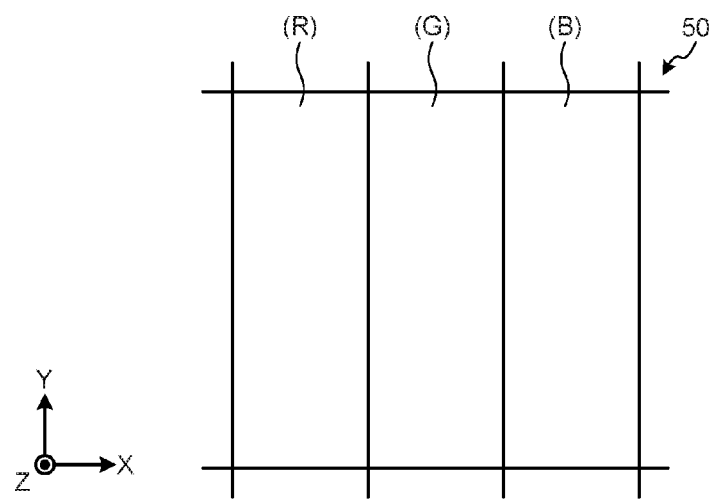
FIG. 3 is a schematic view of a pixel.

For example, the color filter 32 is configured such that color filters colored in red (R), green (G), and blue (B) are periodically arranged, and three colors of R, G, and B are associated with each of the pixels 50 as a set. FIG. 3 is a schematic view of the pixel. For example, a pixel 50 serving as a unit for forming a color image includes a plurality of sub pixels. In this example, the pixel 50 includes a sub pixel (R) indicating R, a sub pixel (B) indicating B, and a sub pixel (G) indicating G. The sub pixels (R), (B), and (G) included in the pixel 50 are arranged in the X direction, that is, a row direction of the display device 1. The color filter 32 may be a combination with another color when the color filter 32 is colored in a different color. One pixel may include three or more sub pixels, for example, four sub pixels. An arrangement direction of the sub pixels is not limited to the X direction, and the sub pixels may be arranged in the Y direction or the X and Y directions. The display device 1 is not limited to a display device that supports a color display and may be applied to both a display device that supports a monochrome display and a display device that supports a color display.

Next, a configuration example of the barrier unit 6 will be described. As illustrated in FIG. 2, the barrier unit 6 includes the first substrate 121 and the second substrate 131, and the first substrate 121 adheres to the second substrate 131 through a seal portion 140. A plurality of first electrodes 122 are arranged above the first substrate 121 in a column form. A second electrode 133 is arranged at the first electrode 122 side of the second substrate 131, and a polarization plate 135 is arranged on the other surface of the second substrate 131.

The first electrodes 122 are a plurality of electrodes that are arranged in association with the transmissive region 61 and the non-transmissive region 62 illustrated in FIG. 1. The first electrodes 122 have a long and thin flat shape extending the Y direction, similarly to the transmissive region 61 and the non-transmissive region 62 illustrated in FIG. 1, and are arranged in the X direction in a plurality of column forms. In other words, the plurality of first electrodes 122 are arranged with intervals therebetween in the X direction in which the sub pixels (R), (B), and (G) of the pixel 50 are arranged, and arranged to overlap at last portions of the respective pixels 50. The first electrodes 122 are formed to extend along the pixels 50 arranged in the Y direction and overlap at least portions of the respective pixels 50 arranged in the Y direction. The second electrodes 133 are common electrodes that face the plurality of first electrodes 122 and consecutively formed. The second electrode 133 may be divided into two or more to face the plurality of first electrodes 122.

A region sandwiched between the surface of the second substrate 131 at the second electrode 133 side and the surface of the first substrate 121 at the first electrode 122 side is filled with the liquid crystal layer 160. The liquid crystal layer 160 functions to modulate light passing through the liquid crystal layer 160 according to a state of an electric field. The liquid crystal used in the liquid crystal layer 160, in the present embodiment, is a liquid crystal suitable for use in the liquid crystal display panels of various kinds of modes such as the TN, the VA, and the ECB. The liquid crystal used in liquid crystal layer 160 is not limited thereto, and the liquid crystal of the horizontal field mode may be used. For example, the liquid crystal of the horizontal field mode such as the IPS may be used. An orientation film (not illustrated) is arranged between the liquid crystal layer 160 and the first substrate 121, and an orientation film (not illustrated) is arranged between the liquid crystal layer 160 and the second substrate 131. Each of the orientation films is formed, for example, using polyimide, and undergoes a rubbing process. An orientation direction of liquid crystal molecules of the liquid crystal layer 160 is regulated by the orientation film. An incidence side polarization plate may be arranged on a lower surface side of the first substrate 121, that is, the display unit 4 side.

Figure 4:
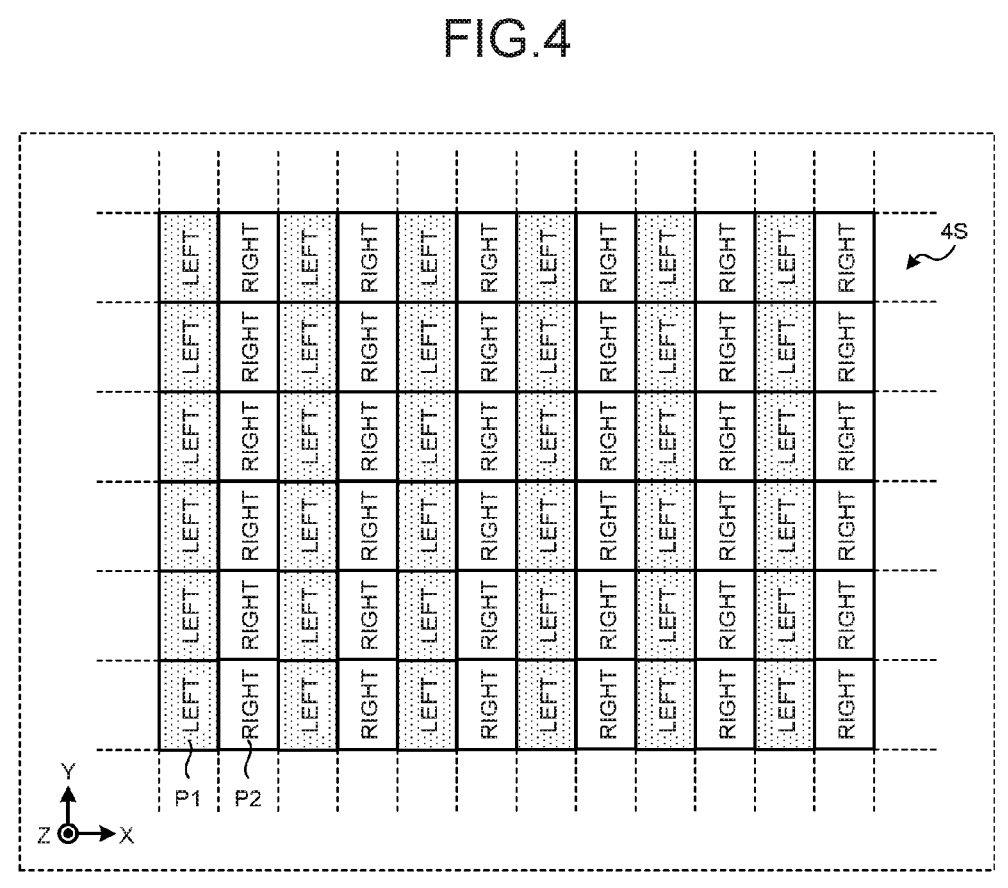
Figure 5:
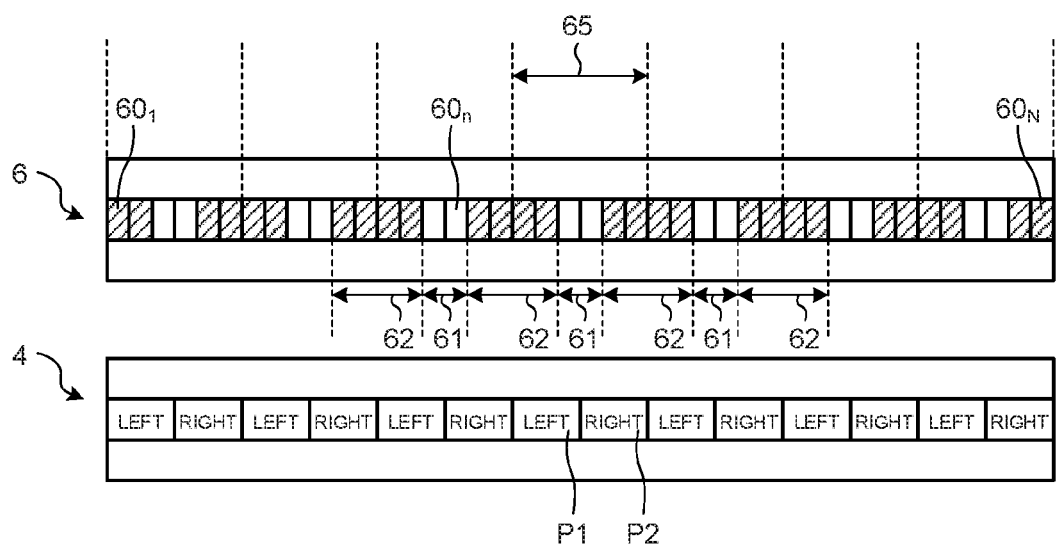
FIG. 5 is a cross-sectional view schematically illustrating a sectional structure of a barrier unit and a display unit.
Figure 6:
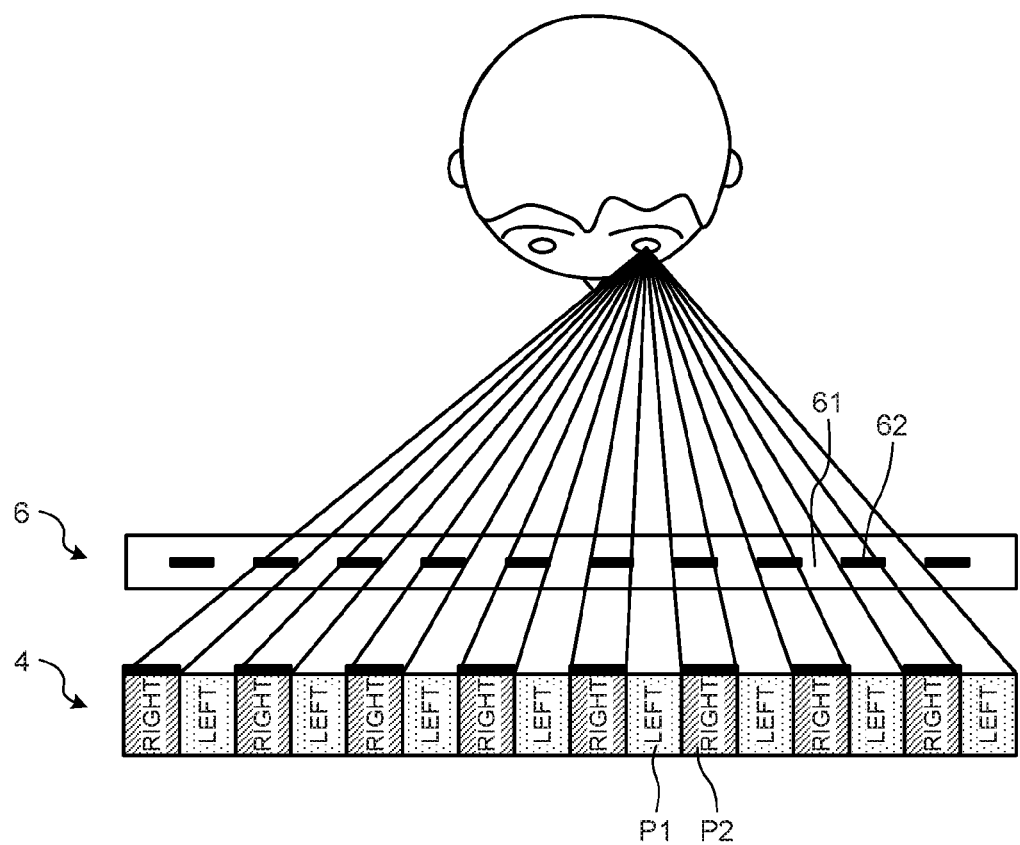
FIG. 6 is an explanatory view for describing a relation between a line of sight of an observer and a barrier unit.

FIG. 4 is a schematic view illustrating an example of a display of a right-eye image and a left-eye image displayed on the display unit. FIG. 5 is a cross-sectional view schematically illustrating cross-sectional structures of the barrier unit and the display unit. FIG. 6 is an explanatory view for describing a relation between a line of sight of an observer and the barrier unit. The display unit 4 displays images (for example, a left-eye image P1 and a right-eye image P2) corresponding to a plurality of viewpoints within one screen so that the observer can view a three-dimensional (3D) image as illustrated in FIG. 4. The left-eye image P1 and the right-eye image P2 are alternately displayed in the X direction. In the present embodiment, each of the pixels of the left-eye image P1 and the right-eye image P2 illustrated in FIG. 4 is the pixel 50 including the three sub pixels (R), (B), and (G) illustrated in FIG. 3. Alternatively, each of the pixels of the left-eye image P1 and the right-eye image P2 may be, for example, one sub pixel among the three sub pixels (R), (B), and (G).

A plurality of unit regions 60 corresponding to one first electrode 122 (which is not illustrated in FIG. 5) are arranged in the barrier unit 6 as illustrated in FIG. 5. The barrier unit 6 controls the electric field to be applied to the liquid crystal layer 160 illustrated in FIG. 2 for each unit region 60 such that switching between the transmissive region 61 and the non-transmissive region 62 can be performed. For example, the unit region 60 includes, for example, N unit regions $60_1$ to $60_N$. A unit region 60 of an n-th column (here, n=1, 2, . . . , N) is indicated by a unit region $60_n$.

Each of the positions of the transmissive region 61 and the non-transmissive region 62 of the barrier unit 6 includes a plurality of unit regions 60 as illustrated in FIG. 5. The transmissive region 61 and the non-transmissive region 62 are alternately arranged in the X direction. An interval at which the transmissive region 61 is repeatedly arranged is referred to as a "barrier pitch 65" as illustrated in FIG. 5. In the present embodiment, one barrier pitch 65 is the width of the six unit regions 60. The six unit regions include the non-transmissive regions 62 and 62 each of which includes the two unit regions 60, and the transmissive region 61 including the two unit regions 60 sandwiched between the non-transmissive regions 62 and 62. For example, the barrier pitch 65 is an interval between the center of one of the two neighboring non-transmissive regions 62 with the transmissive region 61 sandwiched therebetween and the center of the other non-transmissive region 62.

Each of the barrier pitches 65 illustrated in FIG. 5 has the width of the six unit regions 60 (that is, the width corresponding to the six first electrodes 122 illustrated in FIG. 2) but is not limited to a schematically illustrated one. The width of the barrier pitch 65 and the number of unit regions 60 may appropriately be changed. In FIG. 5, the barrier pitch 65 of the transmissive region 61 and the pitch of the left-eye image P1 and the right-eye image P2 are illustrated to be equal to each other but may be different from each other. For example, the barrier pitch 65 of the barrier unit 6 may be smaller than the pitch of the left-eye image P1 and the right-eye image P2 of the display unit 4.

As the positions of the transmissive region 61 and the non-transmissive region 62 of the barrier unit 6 are arranged as illustrated in FIG. 6, the left eye of the observer views the left-eye image P1 through the transmissive region 61. The right-eye image P2 is blocked by the non-transmissive region 62 and not viewed by the left eye of the observer. The right eye of the observer views the right-eye image P2 through the transmissive region 61. The left-eye image P1 is blocked by the non-transmissive region 62 and not viewed by the right eye of the observer. In order to make it easy to view, a relation between the line of sight of the right eye of the observer and the barrier unit 6 is omitted in FIG. 6. As the parallax is formed by the barrier unit 6, the observer who is viewing the display plane 4S of the display unit 4 at a predetermined position can view a 3D image with the naked eyes. As described above, the barrier unit 6 can switch the transmissive region 61 and the non-transmissive region 62. Thus, the barrier unit 6 can perform switching between a 3D display for forming the parallax and enabling the observer to stereoscopically view a display image of the display unit 4 and a 2D display for enabling the observer to planarly view a display image of the display unit 4 without forming the parallax. In the case of at least the 2D display, the barrier unit 6 sets the entire region to the transmissive region 61 so that the display image is transmitted.

Figure 7:
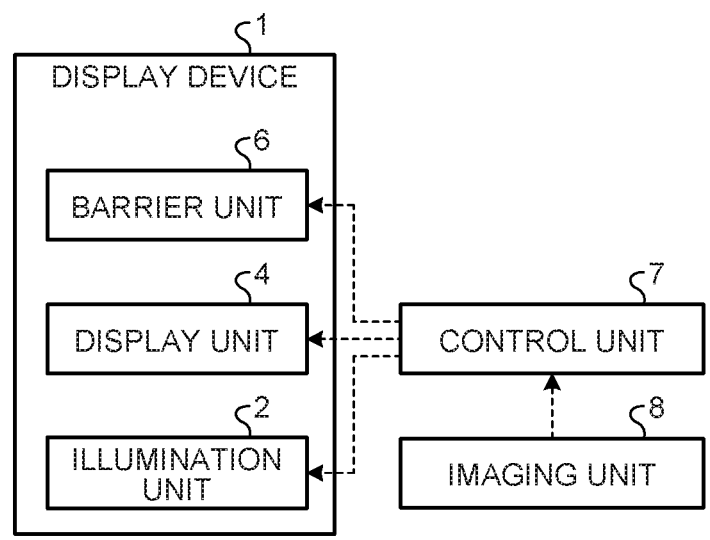
FIG. 7 is a block diagram illustrating an example of a functional configuration of a display device according to an embodiment.

FIG. 7 is a block diagram illustrating an example of a functional configuration of the display device according to the embodiment. A control unit 7 controls the illumination unit 2, the display unit 4, and the barrier unit 6 of the display device 1 as illustrated in FIG. 7. The control unit 7 includes a position information acquiring unit (not illustrated) that calculates position information of the observer based on information of an image acquired by an imaging unit 8. The position information acquiring unit may be arranged separately from the control unit 7 and may be arranged integrally with the imaging unit 8, for example. In the present embodiment, a head tracking technique, an eye tracking technique, or the like may be used. The position information acquiring unit calculates the position information of the observer based on the image information of the observer acquired by the imaging unit 8. The control unit 7 controls the illumination unit 2, the display unit 4, and the barrier unit 6 according to the position information of the observer calculated by an internal or external position information acquiring unit such that the 3D image is displayed.

In the present embodiment, the imaging unit 8 acquires an image of a observer. An example of the imaging unit 8 includes a digital camera. In the present embodiment, the position information of the observer is acquired based on the image photographed by the imaging unit 8, but a position information acquisition method is not limited thereto. For example, the position information of the user may be acquired using one or more of a temperature sensor such as an infrared sensor, a voice sensor such as a microphone, an optical sensor, and the like.

The position information acquiring unit installed inside or outside the control unit 7 detects or measures the position of the observer within the image, for example, positions of the left eye and the right eye of the observer from the image information of the imaging unit 8, and calculates XYZ coordinates on the display plane 4S. Based on the position information of the observer calculated by the position information acquiring unit, the control unit 7 controls lighting-up and lighting-off of the illumination unit 2 of the display device 1 and a light quantity and intensity of light at the time of lighting-up, controls the image to be displayed on the display unit 4, and controls the positions of the transmissive region 61 and the non-transmissive region 62 of the barrier unit 6.

Figure 8:
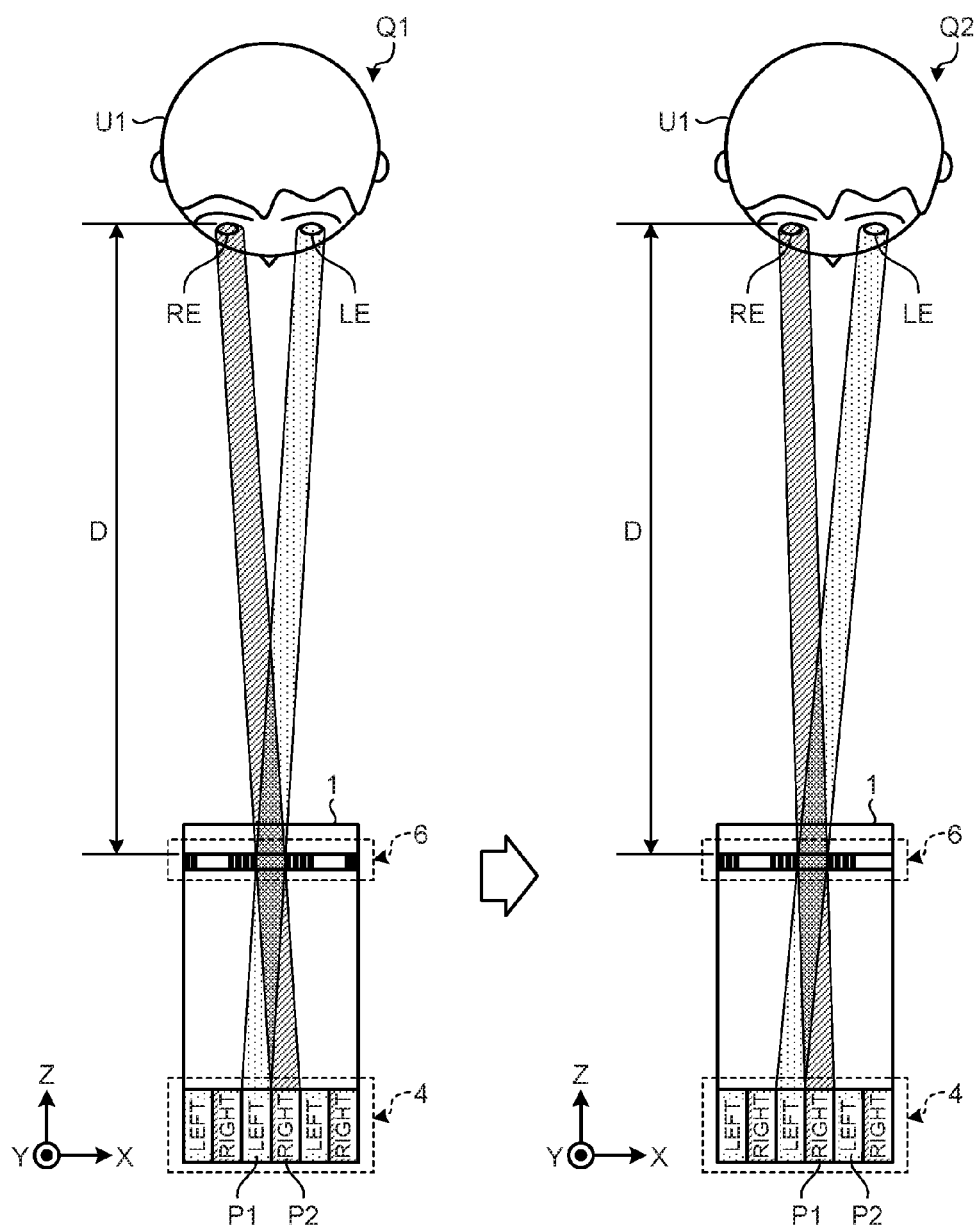
FIG. 8 is a view illustrating a concept of a method for controlling a display device when an observer has moved in a horizontal direction with respect to a display plane.

FIG. 8 is a view illustrating a concept of a method for controlling the display device when the observer has moved in the horizontal direction with respect to the display plane. The position information acquiring unit installed inside or outside the control unit 7 calculates positions of a right eye RE and a left eye LE of an observer U1 and a distance from the display device 1 in an initial state Q1. Then, the control unit 7 decides a display of the image in the display unit 4 according to the positions of the right eye RE and the left eye LE and the distance calculated by the position information acquiring unit. For example, the control unit 7 decides a display so that the left-eye image P1 and the right-eye image P2 are alternately displayed in the X direction as illustrated in FIG. 4. A display method of the left-eye image P1 and the right-eye image P2 is not particularly limited, and the observer U1 has only to be able to secure the parallax of the left eye LE and the right eye RE. Then, the control unit 7 decides the positions of the transmissive region 61 and the non-transmissive region 62 of the barrier unit 6, and executes switching of the transmissive region 61 and the non-transmissive region 62 on each of the unit regions $60_1$ to $60_N$ illustrated in FIG. 5. As a result, for example, as illustrated in FIG. 8, the left eye LE of the observer U1 views the left-eye image P1 through the barrier unit 6, and the right eye RE of the observer U1 views the right-eye image P2 through the barrier unit 6. The switching of the positions of the transmissive region 61 and the non-transmissive region 62 of the barrier unit 6 is performed at the same time or substantially at the same time as the switching of the left-eye image P1 and the right-eye image P2 in the display unit 4 and not particularly limited to the above order.

Then, as illustrated in FIG. 8, in a state Q2 in which the position of the observer U1 has moved in the X direction, the position information acquiring unit installed inside or outside the control unit 7 calculates the position of the observer based on the image data acquired by the imaging unit 8 and the positions of the right eye RE and the left eye LE of the observer U1. Then, the control unit 7 changes the display of the left-eye image P1 and the right-eye image P2 according to the positions of the right eye RE and the left eye LE calculated by the position information acquiring unit. In other words, in the state Q2 illustrated in FIG. 8, the control unit 7 controls the switching of the positions of the transmissive region 61 and the non-transmissive region 62 of the barrier unit 6, the right-eye image P2 is viewed at the position of the right eye RE, and the left-eye image P1 is viewed at the position of the left eye LE, and thus the observer views the image three-dimensionally. At the same time or substantially at the same time as the switching of the positions of the transmissive region 61 and the non-transmissive region 62 of the barrier unit 6, positions of a row of pixels of the left-eye image P1 and a row of pixels of the right-eye image P2 may be changed.

Figure 9:
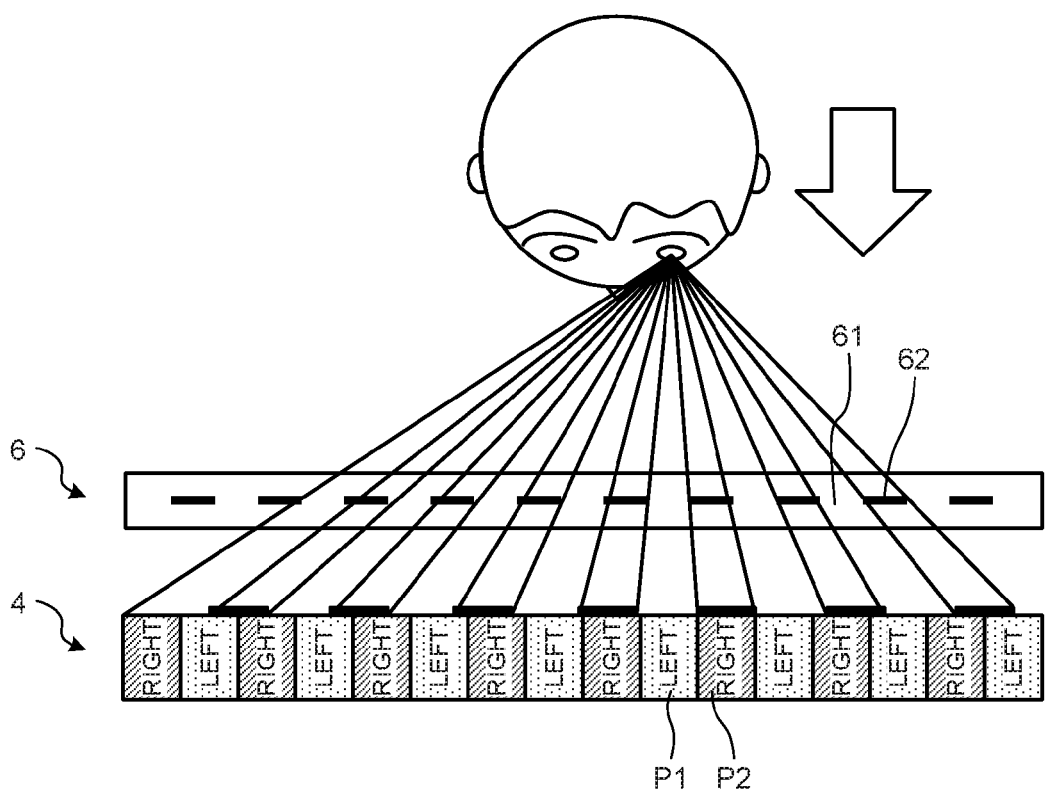
FIG. 9 is an explanatory view for describing a relation between a line of sight of an observer and a barrier unit when an observer has moved in a front-back direction with respect to a display plane.

FIG. 9 is an explanatory view for describing a relation between the line of sight of the observer and the barrier unit when the observer has moved in the front-back direction with respect to the display plane. As illustrated in FIG. 9, when the observer has moved in the front-back direction, a deviation occurs in the transmissive region 61 and the non-transmissive region 62 between the line of sight of the observer and the display image of the display unit 4. For this reason, a part of the right-eye image P2 is viewed by the left eye of the observer, and a crosstalk is likely to occur.

Figure 10:
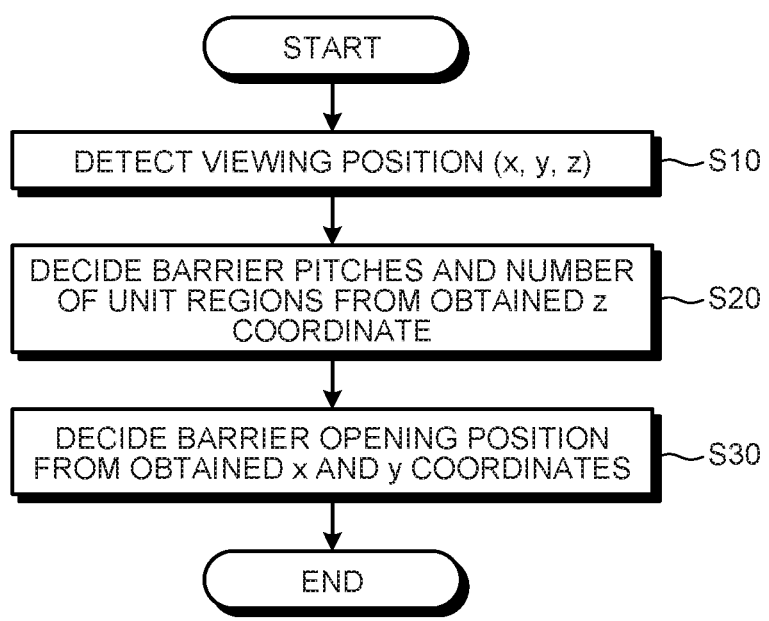
FIG. 10 is a flowchart for describing an example of a method for controlling a display device according to an embodiment.
Figure 11:
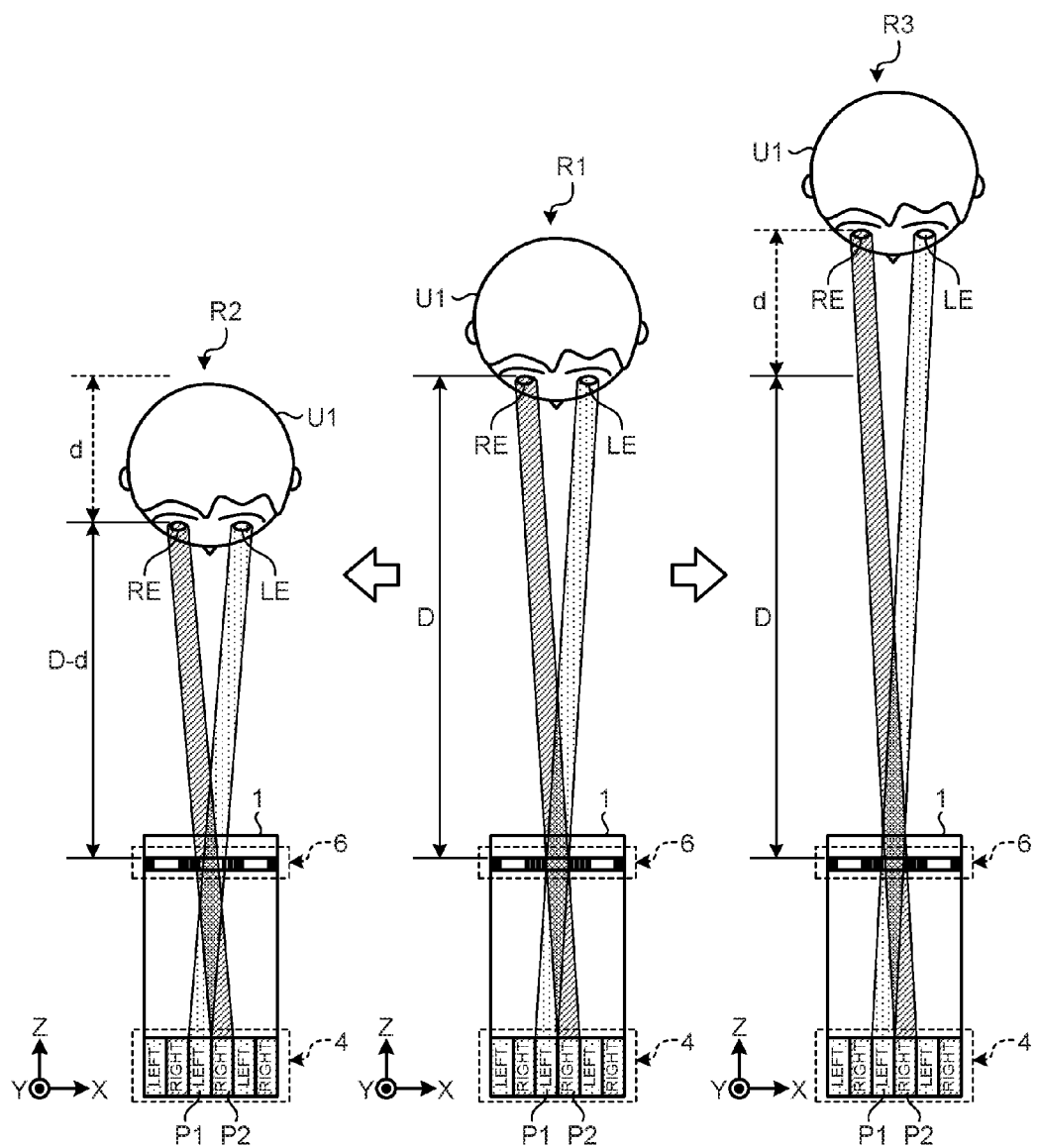
FIG. 11 is a view illustrating a concept of a method for controlling a display device when an observer has moved in a front-back direction with respect to a display plane.
Figures 12A, 12B, 12C:
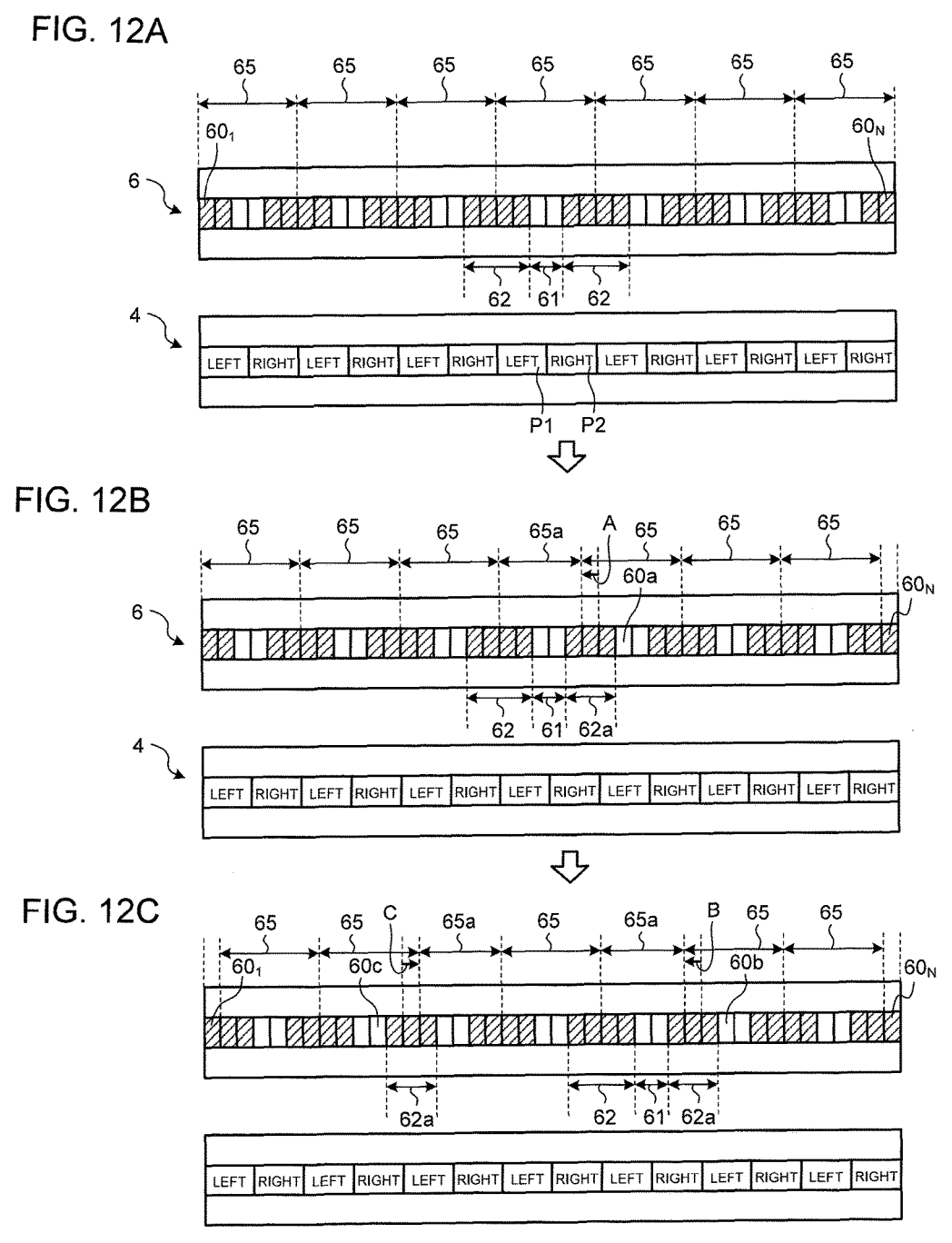
Figure 13A:
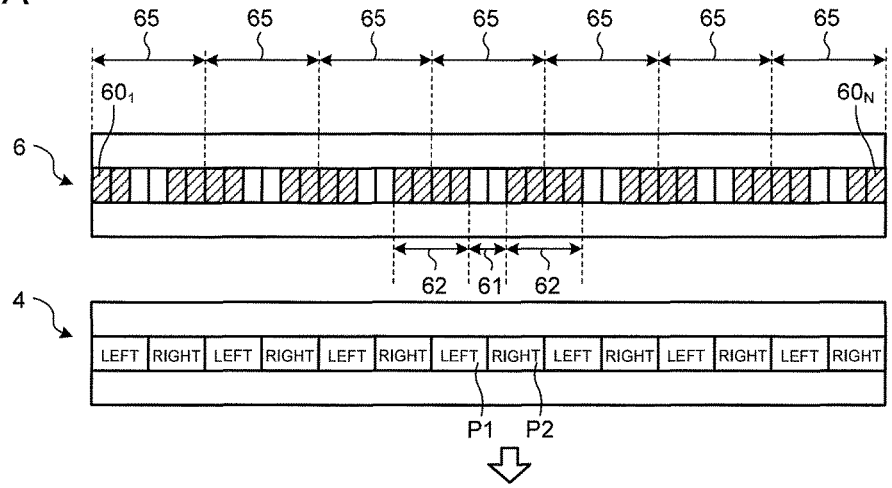
FIGS. 13A to 13C are views illustrating an example of a method for controlling a barrier unit when an observer gets away from a display plane in a front-back direction.
Figure 13B:
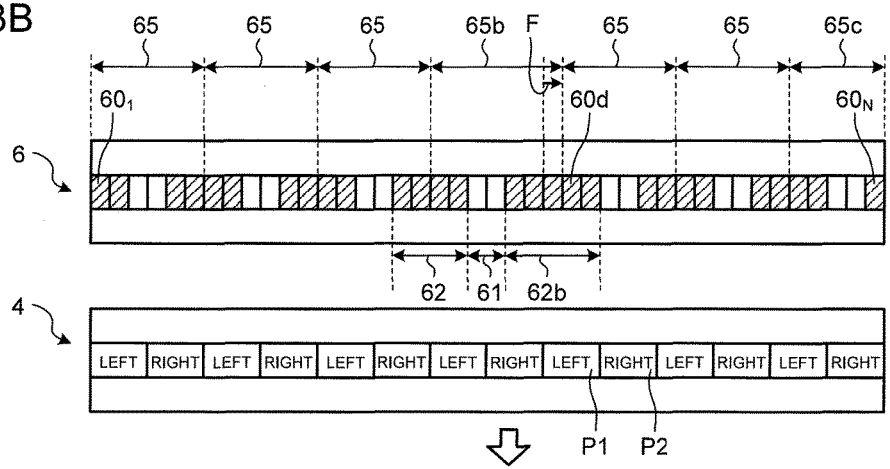
Figure 13C:
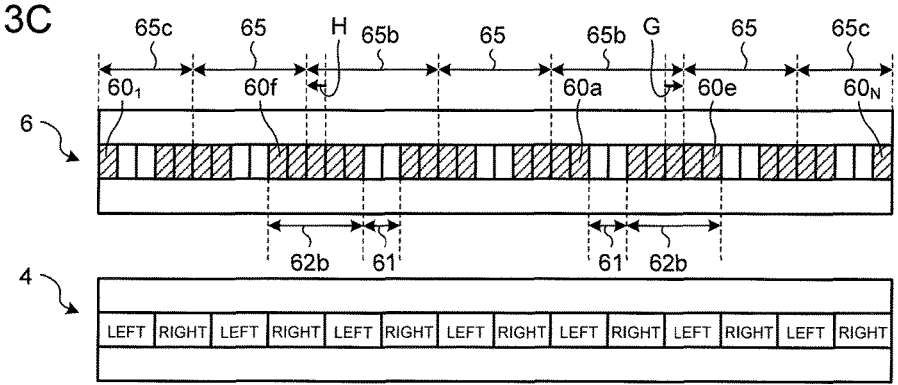

Next, the method for controlling the barrier unit 6 when the observer has moved in the front-back direction with respect to the display plane 4S will be described. FIG. 10 is a flowchart for describing an example of the method for controlling the display device according to the embodiment. FIG. 11 is a view illustrating a concept of the method for controlling the display device when the observer has moved in the front-back direction with respect to the display plane. FIGS. 12A to 12C are views illustrating an example of the method for controlling the barrier unit when the observer gets closer to the display plane in the front-back direction. FIGS. 13A to 13C are views illustrating an example of the method for controlling the barrier unit when the observer gets away from the display plane in the front-back direction.

In FIG. 11 to FIG. 13C, the observer U1 is assumed to be positioned at the center of the display plane 4S of the display unit 4.

First, the position information acquiring unit installed inside or outside the control unit 7 detects a viewing position of the observer from the image data acquired by the imaging unit 8 (step S10). The viewing position of the observer indicates a face-related position (for example, a central position between the right eye RE and the left eye LE) that can be specified from the positions of the right eye and the left eye of the observer U1. The position information acquiring unit calculates the XYZ coordinates of the viewing position, for example, using the center of the display plane 4S of the display unit 4 as an original point. Then, the control unit 7 calculates a distance between the observer U1 and the barrier unit 6. For example, in the present embodiment, a distance between the central position of the positions of the right eye RE and the left eye LE and the barrier unit 6 in the direction perpendicular to the display plane is calculated.

Then, the barrier pitch and the number of unit regions are decided from the distance between the observer U1 and the barrier unit 6 calculated in step S10 (step S20). Here, an appropriate distance between the observer U1 and the barrier unit 6 when the observer views the image displayed on the display unit 4 is referred to as an "appropriate viewing distance D." The control unit 7 stores the appropriate viewing distance D in advance. An initial state R1 of FIG. 11 is an explanatory view schematically illustrating a positional relation between the observer U1 and the display device 1 when the observer U1 is positioned at a reference position. FIG. 12A is a schematic cross-sectional view of the barrier unit 6 and the display unit 4 when the observer U1 is positioned at the reference position (in the initial state R1).

Here, the reference position refers to a position at which the observer can successfully view the display image of the display unit 4 as the 3D image without incurring a crosstalk when the transmissive regions 61 of the barrier unit 6 are arranged at a predetermined barrier pitch 65, for example, as illustrated in FIG. 12A. The appropriate viewing distance D refers to a distance between the observer U1 positioned at the reference position and the barrier unit 6 in the direction (the Z direction) vertical to the display plane 4S.

The control unit 7 calculates a barrier pitch X1 when the observer U1 is positioned at the reference position using the following Formula (1). Here, p indicates a pixel pitch of the pixel 50, and E indicates a distance between eyes (the distance between the right eye RE and the left eye LE of the observer).

$$X1 = 2pE/(p+E) \quad (1)$$

A state R2 of FIG. 11 is an explanatory view schematically illustrating a positional relation between the observer U1 and the display device 1 when the observer U1 has moved from the reference position toward the display unit 4 side to be positioned ahead of the appropriate viewing distance D by a distance d. FIG. 12B is a schematic cross-sectional view illustrating the barrier unit 6 and the display unit 4 when the observer U1 has moved from the reference position toward the display unit 4 side to be positioned ahead of the appropriate viewing distance D by the distance d (the state R2). The control unit 7 acquires the distance d between the reference position and the position of the observer U1 in the direction (the Z direction) vertical to the display plane 4S as the position information of the observer U1 through the position information acquiring unit. A barrier pitch X2 when the observer U1 has moved from the reference position toward the display unit 4 side by the distance d is calculated using the following Formula (2).

$$X2 = 2pE/(pD/(D-d)+E) \quad (2)$$

Then, the control unit 7 calculates an accumulation Xa of a deviation of the barrier pitch X2 using Formula (3). The accumulation Xa of the deviation of the barrier pitch X2 is a value obtained by multiplying a difference (X2−X1) between the barrier pitch X1 when the observer U1 is positioned at the reference position and a the barrier pitch X2 when the observer U1 gets closer by the distance d by the number B of barriers (the number of transmissive regions 61).

$$Xa = (X2-X1) \times B \quad (3)$$

The control unit 7 compares the accumulation Xa of the deviation of the barrier pitch X2 with the width (the width of the unit region 60) corresponding to one first electrode 122 illustrated in FIG. 2. The control unit 7 calculates a maximum of $n_1$ (here, $n_1$=1, 2, . . . , N) satisfying the following Formula 4. W indicates the width (the width of the unit region 60) corresponding to one first electrode 122.

$$Xa > n_1 \times W \quad (4)$$

When $n_1$=1, that is, when the accumulation Xa of the deviation of the barrier pitch X2 has a value larger than the width W of one first electrode 122, the control unit 7 reduces a barrier pitch 65a positioned at the center of the barrier unit 6 as illustrated in FIG. 12B. Specifically, the control unit 7 switches a unit region 60a illustrated in FIG. 12B from the non-transmissive region 62 to the transmissive region 61, and reduces the width of one non-transmissive region 62a among a plurality of non-transmissive regions 62 and a plurality of transmissive regions 61. Then, the transmissive region 61 and the non-transmissive region 62 that are positioned in the X direction further than the non-transmissive region 62a of which width has been reduced are shifted by a change amount (one unit region 60) of the width indicated by an arrow A. A unit region $60_N$ positioned at the outermost side in the X direction is the non-transmissive region 62.

When $n_1$=1, the barrier pitch 65a in the central portion is reduced, and except the barrier pitch 65a, the equal barrier pitches 65 are consecutive. The width of the barrier pitch 65a of which width has been reduced is the width of the five unit regions 60 and smaller than the barrier pitch 65 neighboring the barrier pitch 65a by one unit region 60. The barrier pitch 65a includes the non-transmissive region 62 including the two unit regions 60, the transmissive region 61 including the two unit regions 60, and the non-transmissive region 62 including one unit region 60. In other words, in the barrier pitch 65a, the two non-transmissive regions 62 and 62 with the transmissive region 61 interposed therebetween differ in the number of unit regions 60 and are formed at different widths. On the other hand, in the barrier pitch 65 neighboring the barrier pitch 65a, each of the two non-transmissive regions 62 and 62 with the transmissive region 61 interposed therebetween includes the two unit regions 60, and the two non-transmissive regions 62 and 62 have the same width.

When the observer U1 has further moved from the reference position toward the display unit 4 side, and the accumulation Xa of the deviation of the barrier pitch X2 has a value larger than the width of the two first electrodes 122, $n_1$=2 is calculated by Formula (4) described above. When $n_1$=2 is calculated, the control unit 7 decides 2 as the number of barrier pitches 65a to be reduced as illustrated in FIG.

12C. When the number of barrier pitches 65a to be reduced is two or more, the barrier pitches 65a may be arranged equally in the X direction. For example, a plurality of barrier pitches 65a are arranged to be symmetric while sandwiching the central portion of the barrier unit 6.

Each of the two barrier pitches 65a and 65a includes the five unit regions 60 as illustrated in FIG. 12C. The barrier pitch 65 including the six unit regions 60 is located between the two barrier pitches 65a and 65a. The barrier pitches 65 each of which includes the six unit regions 60 are consecutive outside the two barrier pitches 65a and 65a.

As illustrated in FIG. 12C, the control unit 7 performs switching from the non-transmissive region 62 to the transmissive region 61 for the two unit regions 60b and 60c, and reduces the widths of the two non-transmissive regions 62a and 62a among a plurality of non-transmissive regions 62 and a plurality of transmissive regions 61. Then, the control unit 7 shifts the transmissive region 61 and the non-transmissive region 62 positioned at the outer side further than the non-transmissive regions 62a and 62a of which width has been reduced in the X direction to the center side by the change amount (one unit region 60) of the width indicated by arrows B and C. The two unit regions $60_1$ and $60_N$ positioned at the outermost side in the X direction are the non-transmissive region 62.

When the observer U1 has gotten closer, the control unit 7 switches the transmissive region 61 and the non-transmissive region 62 for the unit regions 60 that correspond in number to the number of $n_1$ obtained by Formula (4), and increases the number of barrier pitches 65a to be reduced to 3 or more. When a plurality of small barrier pitches 65a are arranged, the plurality of small barrier pitches 65a may be arranged equally in the X direction. In this case, more preferably, a plurality of small barrier pitches 65a are arranged at equal intervals. More specifically, a plurality of small barrier pitches 65a may be arranged so that a difference in the number of barrier pitches 65 of which width does not change between the neighboring small barrier pitches 65a is a predetermined value or less, for example, 0 or 1. Alternatively, a plurality of small barrier pitches 65a may be arranged so that a difference in the number of barrier pitches 65 of which width does not change between the neighboring small barrier pitches 65a, and between the outermost barrier pitch 65a and an end portion of the barrier unit 6 is a predetermined value or less, for example, 0 or 1.

As described above, when the viewpoint position of the observer U1 in the front-back direction has gotten closer to the display plane 4S of the display device 1, the control unit 7 calculates the number $n_1$ of barrier pitches 65a to be reduced. Then, the control unit 7 reduces the barrier pitches 65 that correspond to the number corresponding to $n_1$, and the positions of the transmissive region 61 and the non-transmissive region 62 are optimized. Thus, the occurrence of the crosstalk is suppressed, and the range in which a stereoscopic view is possible in the front-back direction is increased.

Next, the method for controlling the barrier unit 6 when the observer U1 gets away from the display unit 4 to be positioned to be behind the reference position will be described. A state R3 of FIG. 11 is an explanatory view schematically illustrating a positional relation between the observer U1 and the display device 1 when the observer U1 has gotten away from the display unit 4 to be positioned behind the appropriate viewing distance D by the distance d. FIG. 13A is a schematic cross-sectional view illustrating the barrier unit 6 and the display unit 4 when the observer U1 is positioned at the reference position (in the initial state R1).

FIG. 13B is a schematic cross-sectional view illustrating the barrier unit 6 and the display unit 4 when the observer U1 has gotten away from the display unit 4 to be positioned behind the appropriate viewing distance D by the distance d. First, when the observer U1 gets away from the display unit 4 to be positioned behind the reference position by the distance d, the control unit 7 calculates a barrier pitch X3 using the following Formula (5).

$$X3=2pE/(PD/(D+d)+E) \tag{5}$$

Then, the control unit 7 calculates an accumulation Xb of a deviation of the barrier pitch X3 using Formula (6). Here, B indicates the number of barriers (the number of transmissive regions 61).

$$Xb=(X1-X3)\times B \tag{6}$$

The control unit 7 compares the accumulation Xb of the deviation of the barrier pitch X3 with the width (the width of the unit region 60) corresponding to one first electrode 122 illustrated in FIG. 2. The control unit 7 calculates a maximum of $n_2$ (here, $n_2=1, 2, \ldots, N$) satisfying the following Formula (7). W indicates the width (the width of the unit region 60) corresponding to one first electrode 122.

$$Xb>n_2 \times W \tag{7}$$

When $n_2=1$, that is, when the accumulation Xb of the deviation of the barrier pitch X3 has a value larger than the width W of one first electrode 122, the control unit 7 increases a barrier pitch 65b positioned at the center of the barrier unit 6 as illustrated in FIG. 13B. Specifically, the control unit 7 switches a unit region 60d illustrated in FIG. 13B from the transmissive region 61 to the non-transmissive region 62, and increases the width of one non-transmissive region 62a. Then, the control unit 7 shifts the transmissive region 61 and the non-transmissive region 62 that are positioned in the X direction further than the non-transmissive region 62a of which width has been increased by a change amount (one unit region 60) of the width indicated by an arrow F. In the present embodiment, a unit region $60_N$ positioned at the outermost side in the X direction is the non-transmissive region 62 as illustrated in FIG. 13B.

When $n_2=1$, the barrier pitch 65b having a large width is arranged only in the central portion of the barrier unit 6, and the equal barrier pitches 65 are repeatedly consecutive outside the barrier pitch 65b. The barrier pitch 65b includes a more number of unit regions 60 than the barrier pitch 65. The barrier pitch 65b includes the transmissive region 61 including the two unit regions 60 and the two non-transmissive regions 62 and 62 including different number of unit regions 60.

When the observer U1 has further gotten away from the display unit 4, and the accumulation Xb calculated by Formula (5) has a value larger than the width of the two first electrodes 122, $n_2=2$ is calculated by Formula (7) described above. In this case, the number of barrier pitches 65b to be increased is set to 2. When the number of barrier pitches 65b to be increased is two or more, the barrier pitches 65b may be arranged equally in the X direction as illustrated in FIG. 13C. For example, a plurality of barrier pitches 65b are arranged to be symmetric while sandwiching the central portion of the barrier unit 6. More preferably, a plurality of large barrier pitches 65b are arranged at equal intervals.

Specifically, as illustrated in FIG. 13C, the control unit 7 performs switching from the transmissive region 61 to the non-transmissive region 62 for two unit regions 60e and 60f, and increases the widths of the two non-transmissive regions 62b and 62b. Then, the control unit 7 shifts the transmissive region 61 and the non-transmissive region 62 positioned at the outer side further than the non-transmissive regions 62b and 62b of which width has been increased to the outer side by the change amount (one unit region 60) of the width indicated by arrows G and H. The two unit regions $60_1$ and $60_N$ positioned at the outermost side in the X direction are the non-transmissive region 62.

When $n_2=2$, the barrier pitch 65 including the six unit regions 60 is arranged between the two barrier pitches 65b and 65b. The barrier pitch 65 including the six unit regions 60 is arranged outside the two barrier pitches 65b and 65b. However, as a result of shifting the transmissive region 61 and the non-transmissive region 62, the widths of the two barrier pitches 65c positioned at the outermost side are reduced.

When the observer U1 has further gotten away, the control unit 7 switches the transmissive region 61 and the non-transmissive region 62 for the unit regions 60 that correspond to the number of $n_2$ obtained by Formula (7), and increases the number of barrier pitches 65b to be increased. As a result of shifting the transmissive region 61 and the non-transmissive region 62 to the outer side, the two unit regions $60_1$ and $60_N$ positioned at the outermost side may be the transmissive region 61, but the control unit 7 may constantly fix the non-transmissive region 62 as the unit regions $60_1$ and $60_N$.

As described above, when the viewpoint position of the observer U1 in the front-back direction to the display plane 4S of the display device 1 is behind the reference position, the control unit 7 calculates the number $n_2$ of barrier pitches 65b to be increased. Then, the control unit 7 increases the barrier pitches 65 that correspond in the number to $n_2$, and thus the positions of the transmissive region 61 and the non-transmissive region 62 are optimized. Thus, the occurrence of the crosstalk is suppressed, and the range in which a stereoscopic view is possible in the front-back direction is increased.

When the transmissive region 61 is decreased by increasing the barrier pitches or arranging the non-transmissive region 62 as the unit regions $60_1$ and $60_N$ positioned at the outermost side, the luminance of the illumination unit 2 may be increased to maintain the luminance of the display image viewed by the observer. In this case, the luminance of the illumination unit 2 is changed before and after switching control of the barrier unit 6 or switching control of the display unit 4.

As described above, the control unit 7 compares the accumulations Xa and Xb of the deviation of the barrier pitch 65 with the width W of one first electrode 122 based on the position information of the observer U1 in the Z direction obtained from the position information acquiring unit, and decides the numbers $n_1$ and $n_2$ of the barrier pitch 65 of which width is to be changed. The control unit 7 changes the widths of the barrier pitches 65 that correspond to the decided numbers $n_1$ and $n_2$ of the barrier pitch 65. Specifically, the width of at least one transmissive region 61 among a plurality of transmissive regions 61 and the width of at least one non-transmissive region 62 among a plurality of non-transmissive regions 62 are changed in units of the unit regions 60. In other words, the width of one transmissive region 61 in the X direction is different from the width of the other transmissive region 61 in the X direction, or the width of one non-transmissive region 62 in the X direction is different from the width of the other non-transmissive region 62 in the X direction. The barrier unit 6 includes a plurality of first electrodes 122, the first electrode 122 is arranged to correspond to the transmissive region 61 or the non-transmissive region 62, the number of first electrodes 122 corresponding to one transmissive region 61 is different from the number of first electrodes 122 corresponding to the other transmissive region 61. The control unit 7 can change the width of at least one barrier pitch 65 and control the display image of the display unit 4 such that the left-eye image P1 and the right-eye image P2 are switched.

As a result, at least one barrier pitch 65 is changed according to the change in the viewpoint position of the observer U1 in the front-back direction with respect to the display plane 4S of the display device 1, and thus the positions of the transmissive region 61 and the non-transmissive region 62 are optimized. Thus, the occurrence of the crosstalk is suppressed, and the range in which a stereoscopic view is possible in the front-back direction is increased. Since the width of at least one transmissive region 61 or at least one non-transmissive region 62 can be changed in units of the unit regions 60, it is possible to control the positions of the positions of the transmissive region 61 and the non-transmissive region 62 of the barrier unit 6 with the higher degree of accuracy than when a plurality of transmissive regions 61 are equally changed. Accordingly, it is possible to suppress the occurrence of the crosstalk reliably. In addition, since the change in the aperture ratio (the ratio of the transmissive region 61 to the entire barrier unit 6) is reduced, it is possible to omit control of the display image of the display unit 4 or control of the illumination unit 2.

Figure 14:
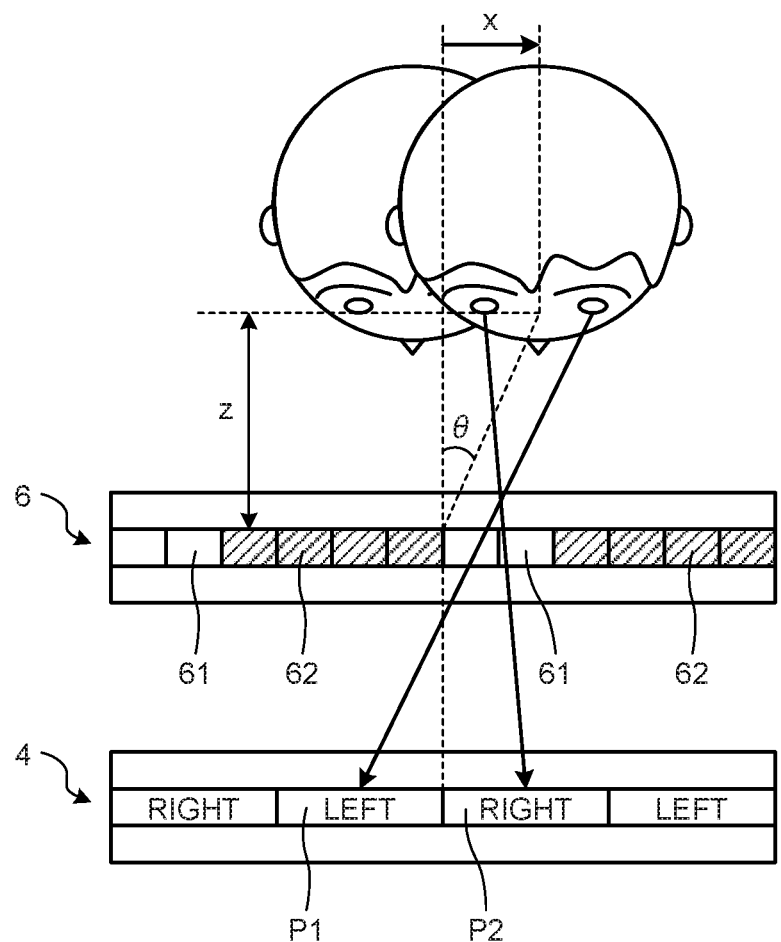
FIG. 14 is an explanatory view for schematically describing a method for controlling a position of a transmissive region of a barrier unit.

Then, as illustrated in FIG. 10, the control unit 7 decides the position (a barrier opening position) of the transmissive region 61 from the XY coordinates of the observer U1 acquired from the position information acquiring unit (step S30). In FIGS. 11 to 13B, the observer U1 has been described as being assumed to be positioned at the center of the display screen of the display unit 4, but the position (the barrier opening position) of the transmissive region 61 is decided according to the XY coordinates of the observer U1. FIG. 14 is an explanatory view for schematically describing a method for controlling the transmissive region of the barrier unit. The position information acquiring unit calculates an angle θ from the central portion of the barrier unit 6 from the XYZ coordinates of the observer U1. The control unit 7 acquires the XYZ coordinates and the angle θ as the position information of the observer U1 from the position information acquiring unit. When at least one barrier pitch 65 is decreased or increased, the control unit 7 shifts the transmissive region 61 and the non-transmissive region 62 entirely according to information of the angle θ of the observer U1. The positions of the transmissive region 61 and the non-transmissive region 62 are decided so that the left-eye image P1 is viewed by the left eye LE, and the right-eye image P2 is viewed by the right eye RE. Thus, the display device 1 of the present embodiment can enable the observer U1 to view the 3D image successfully while suppressing the occurrence of the crosstalk even when the observer U1 moves in the X or Y direction. In this embodiment, the angle θ as the position information of the observer U1 is an angle formed by a line vertical to the barrier unit 6 and a line connecting the central portion of the barrier unit 6 and the observer U1. The angle θ is not limited thereto. The angle θ may be an angle changing in response to a distance between the display device 1 and the observer U1. For example, the angle θ may be an angle formed by a line vertical to the display unit 4 and a line connecting the central portion of the display unit 4 and the observer U1.

As described above, when the viewpoint position of the observer U1 in the front-back direction (the Z direction) with respect to the display plane 4S of the display device 1 changes, the positions of the transmissive region 61 and the non-transmissive region 62 are optimized by changing at least one barrier pitch 65, and when the viewpoint position of the observer U1 in the vertical or horizontal direction (the X or Y direction) changes, the position of the non-transmissive region 62 is optimized, and the barrier pitches 65 are shifted. Thus, the occurrence of the crosstalk is suppressed, and the range in which a stereoscopic view is possible in the front-back direction is increased.

Figure 15:
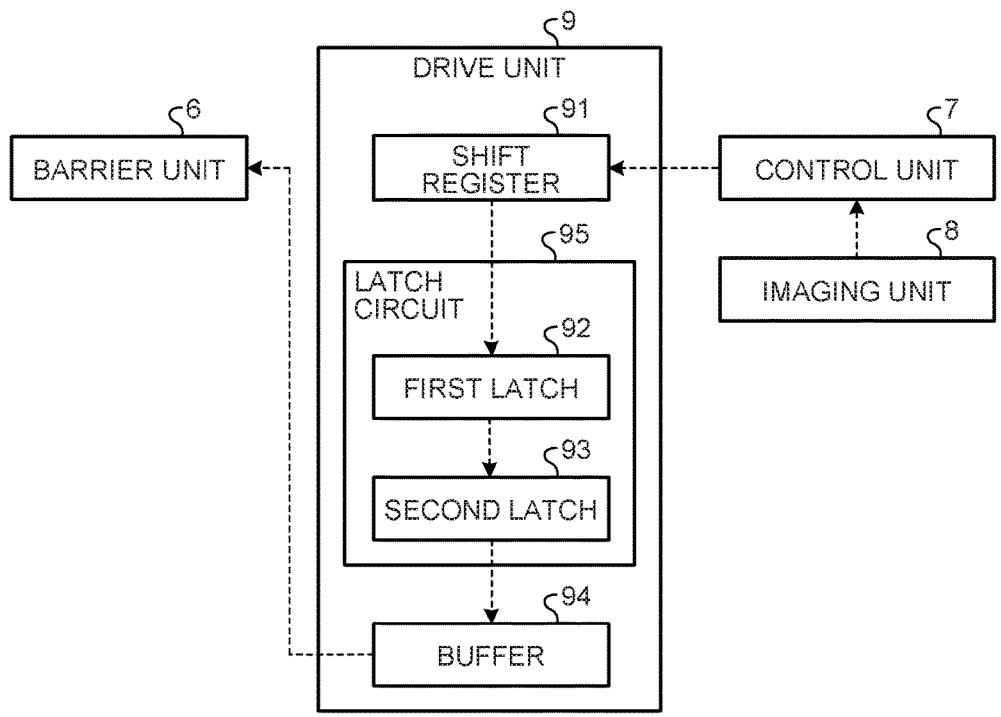
FIG. 15 is a block diagram illustrating an example of a functional configuration of a drive unit that drives a barrier unit.

FIG. 15 is a block diagram illustrating an example of a functional configuration of a drive unit that drives the barrier unit. A drive unit 9 includes a shift register 91 that receives a drive signal from the control unit 7, a latch circuit 95, and a buffer 94 that temporarily accumulates the drive signal of the barrier unit 6 and outputs the drive signal to the barrier unit 6 as illustrated in FIG. 15. The latch circuit 95 includes first and second latches 92 and 93. The first latch 92 sequentially store signals from the shift register 91. The second latch 93 collectively store signals from the first latch 92, and outputs the signals to the buffer 94. The control unit 7 sequentially outputs drive signals to switch or not to switch the transmissive region 61 and the non-transmissive region 62 to the plurality of first electrodes 122 illustrated in FIG. 2 based on the position information (the XYZ coordinates) of the observer U1. The two latches (the first and second latches 92 and 93) store the position information of the first electrode 122 and the drive signal together, and the buffer 94 absorbs a time difference and outputs the drive signal to the barrier unit 6.

Thus, the drive unit 9 can drive the unit regions $60_1$ to $60_N$ corresponding to the plurality of first electrodes 122 with the reduced time difference.

The exemplary embodiment of the present invention has been described above, but the present invention is not limited to the above embodiment. Content disclosed in the embodiment is merely an example, and various changes can be made within the scope not departing from the gist of the present invention. An appropriate change made within the scope not departing from the gist of the present invention is obviously included in the technical range of the present invention.

For example, in the present embodiment, the liquid crystal panel has been described as the display unit 4 of the display device 1, but the display unit 4 of the display device 1 is not limited thereto, and, for example, an organic electro-luminescence (OEL) display or a micro electro mechanical system (MEMS) may be used.

The width of the first electrode 122 illustrated in FIG. 2 and the width of the unit region 60 illustrated in FIGS. 12A to 12C are schematically illustrated and not limited to the present embodiment. The number of unit regions 60 of one barrier pitch 65 or the number of unit regions 60 of the transmissive region 61 and the non-transmissive region 62 is not limited. For example, when the width of the first electrode 122 is small, the width of each unit region 60 is small. For this reason, when the barrier pitch 65 is maintained, the number of unit regions 60 of each transmissive region 61 and each non-transmissive region 62 is large. Thus, it is possible to control the barrier unit 6 with a higher degree of accuracy when the observer U1 moves in the front-back direction. In this case, an increase or decrease in the luminance according to the change in the aperture ratio can be controlled reliably.

In the present embodiment, the parallax adjusting unit changes the width of at least one transmissive region in the first direction among the plurality of transmissive regions or the width of at least one non-transmissive region in the first direction among the plurality of non-transmissive regions based on the position information of the observer observing the display unit in the direction perpendicular to the display plane, but the present invention is not limited thereto. The position information is an example of input information. For example, the input information may include selection information for selecting the position information by the observer, and the width of at least one transmissive region or at least one non-transmissive region may be changed based on the selection information of the observer. More specifically, the control unit 7 includes a memory, and table data in which the number of barrier pitches of which width is to be changed is associated with an input command is stored in the memory. The control unit 7 determines the number of barrier pitches of which width is to be changed according to the input command of the observer based on the table data. Based on the determination result of the control unit 7, the barrier unit 6 may change the width of at least one transmissive region or at least one non-transmissive region.

What is claimed is:

1. A display device, comprising:
    a display unit including a display plane and pixels, the pixels are arranged at a pixel pitch in the display plane; and
    a parallax adjusting unit that has unit regions arranged in a first direction, the unit regions are switchable between transmissive regions that transmit light and non-transmissive regions that restrict the light,
    wherein an observer distance is a distance in a direction perpendicular to the display plane between the parallax adjusting unit and an observer,
    wherein, in a first mode when the observer distance is a reference distance, the parallax adjusting unit is configured to form first barriers,
    wherein, in a second mode when the observer distance is shorter than the reference distance by a first distance, the parallax adjusting unit is configured to form the first barriers and a first number of second barriers, and
    wherein each of the first barriers has a first barrier pitch in the first direction and each of the second barriers has a second barrier pitch, the second barrier pitch is the first barrier pitch minus a first width;
    wherein the display device satisfies a formula:

$X1 = 2pE/(p+E)$ $|2pE/(pD/(D-d)+E) - X1| \times B > n1 \times W$ (n1 is the maximum natural number that would satisfy the formula)
    wherein:
    X1 is the first barrier pitch;
    p is the pixel pitch;
    E is a distance between eyes of the observer;
    D is the reference distance;
    d is the first distance;
    B is a number of the transmissive regions;
    n1 is the first number of the second barriers; and
    W is the first width.

2. The display device according to claim 1,
    wherein the parallax adjusting unit is controllable by input information to switch between the first mode and the second mode, the input information includes position information of the observer distance.

3. The display device according to claim 2, further comprising:
    an imaging unit configured to image the observer; and
    a position information acquiring unit configured to acquire the position information of the observer based on image data received from the imaging unit.

4. The display device according to claim 1, further comprising:
a control unit that is controllable by input information to switch between the first mode and the second mode.

5. The display device according to claim 4, further comprising:
a drive unit configured to receive a drive signal from the control unit and drive the parallax adjusting unit,
wherein the drive unit includes a shift register that is configured to receive the drive signal from the control unit, a latch that is configured to sequentially store a signal from the shift register, and a buffer that is configured to temporarily accumulate a signal from the latch and output the signal to the parallax adjusting unit.

6. The display device according to claim 1,
wherein the second barriers are equally arranged in the first direction.

7. The display device according to claim 1,
wherein the second barriers are arranged to be symmetric on a center of the display plane in the first direction.

8. The display device according to claim 1,
wherein the parallax adjusting unit includes
a first substrate,
a second substrate,
a liquid crystal layer between the first substrate and the second substrate,
first electrodes on the first substrate, each of the first electrodes is in one of the unit regions, and
a second electrode that faces the first electrodes,
wherein the first width is a width of the first electrode in the first direction.

9. The display device according to claim 1,
wherein both ends of the parallax adjusting unit in the first direction are the non-transmissive regions.

10. The display device according to claim 1,
wherein positions of the transmissive regions and positions of the non-transmissive regions are changeable based on information of an angle of the observer in the direction perpendicular to the display plane.

11. The display device according to claim 1,
wherein the parallax adjusting unit is configured to switch between the first mode and the second mode based on input information, the input information includes information of a distance between a reference position of the observer and a position of the observer in a direction perpendicular to the display plane.

12. The display device according to claim 1,
wherein the display unit is configured to display a right-eye image and a left-eye image, the right-eye image and the left-eye image are arranged by a same pitch in the first mode and in the second mode.

13. The display device according to claim 1,
wherein the parallax adjusting unit is configured to switch between a three-dimensional (3D) display and a two-dimensional (2D) display, the image of display unit is stereoscopically viewed by the observer in the three-dimensional (3D) display and is planarly viewed by the observer in the two-dimensional (2D) display.

14. The display device according to claim 1,
wherein each of the first barriers includes a first transmissive region and a first non-transmissive region,
wherein each of the second barriers includes a second transmissive region and a second non-transmissive region,
wherein the parallax adjusting unit is configured to form the second barrier such that a width of the second transmissive region is a width of the first transmissive region minus the first width or a width of the second non-transmissive region is a width of the first non-transmissive region minus the first width.

15. A display device, comprising:
a display unit including a display plane and pixels, the pixels are arranged at a pixel pitch in the display plane; and
a parallax adjusting unit that has unit regions arranged in a first direction, the unit regions are switchable between transmissive regions that transmit light and non-transmissive regions that restrict the light,
wherein an observer distance is a distance in a direction perpendicular to the display plane between the parallax adjusting unit and an observer,
wherein, in a first mode when the observer distance is a reference distance, the parallax adjusting unit is configured to form first barriers,
wherein, in a second mode when the observer distance is longer than the reference distance by a first distance, the parallax adjusting unit is configured to form the first barriers and a first number of second barriers, and
wherein each of the first barriers has a first barrier pitch in the first direction and each of the second barriers has a second barrier pitch, the second barrier pitch is the first barrier pitch plus a first width;
wherein the display device satisfies a formula:

$X1 = 2pE/(p+E)$ $|X1 - 2pE/(pD/(D+d)+E)| \times B > n_1 \times W$ ($n_1$ is the maximum natural number that would satisfy the formula)

wherein:
X1 is the first barrier pitch;
p is the pixel pitch;
E is a distance between eyes of the observer;
D is the reference distance;
d is the first distance;
B is a number of the transmissive regions;
$n_1$ is the first number of the second barriers; and
W is the first width.

16. The display device according to claim 15,
wherein each of the first barriers includes a first transmissive region and a first non-transmissive region,
wherein each of the third barriers includes a third transmissive region and a third non-transmissive region,
wherein the parallax adjusting unit is configured to form the third barrier such that a width of the first transmissive region plus the first width or a width of the third non-transmissive region is a width of the first non-transmissive region plus the first width.

17. The display device according to claim 15,
wherein the display unit is configured to display the right-eye image and the left-eye image, the right-eye image and the left-eye image are arranged by a same pitch in the first mode and in the second mode.

* * * * *